United States Patent
Engerman

(10) Patent No.: US 10,406,915 B2
(45) Date of Patent: Sep. 10, 2019

(54) REAR DRIVE UNIT CLUTCH ASSEMBLY

(71) Applicant: Ford Global Technologies, LLC, Dearborn, MI (US)

(72) Inventor: Eric Matthew Engerman, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 15/446,488

(22) Filed: Mar. 1, 2017

(65) Prior Publication Data

US 2018/0251028 A1   Sep. 6, 2018

(51) Int. Cl.
| | |
|---|---|
| *F16D 15/00* | (2006.01) |
| *B60K 17/35* | (2006.01) |
| *F16H 48/06* | (2006.01) |
| *F16D 28/00* | (2006.01) |
| *F16D 13/40* | (2006.01) |
| *F16D 13/76* | (2006.01) |
| *B60K 17/02* | (2006.01) |
| *B60K 1/04* | (2019.01) |
| *B60K 17/04* | (2006.01) |
| *B60K 23/08* | (2006.01) |

(52) U.S. Cl.
CPC ............ *B60K 17/35* (2013.01); *B60K 1/04* (2013.01); *B60K 17/02* (2013.01); *B60K 17/04* (2013.01); *B60K 17/3515* (2013.01); *B60K 23/0808* (2013.01); *F16D 13/40* (2013.01); *F16D 13/76* (2013.01); *F16D 15/00* (2013.01); *F16D 28/00* (2013.01); *F16H 48/06* (2013.01); *B60K 2023/0875* (2013.01); *B60Y 2400/414* (2013.01); *B60Y 2400/73* (2013.01)

(58) Field of Classification Search
CPC .... F16D 2023/123; F16D 15/00; B60K 17/35
See application file for complete search history.

(56) References Cited

U.S. PATENT DOCUMENTS

| | | | | |
|---|---|---|---|---|
| 3,038,354 | A  * | 6/1962 | Bernard | F16D 27/112 |
| | | | | 475/153 |
| 5,810,141 | A | 9/1998 | Organek et al. | |
| 5,947,857 | A  * | 9/1999 | Organek | F16D 27/112 |
| | | | | 475/149 |
| 6,991,079 | B2 | 1/2006 | Pulu | |
| 9,121,455 | B2 * | 9/2015 | Cooper | F16D 13/54 |
| 9,518,622 | B2 | 12/2016 | Vogel | |
| 2017/0297423 | A1* | 10/2017 | Finkenzeller | B60K 6/48 |
| 2017/0321763 | A1* | 11/2017 | Younggren | F16D 13/385 |
| 2018/0312062 | A1* | 11/2018 | Rudagi | B60K 23/0808 |

FOREIGN PATENT DOCUMENTS

EP          0905396 A1       3/1999

* cited by examiner

*Primary Examiner* — Sherry L Estremsky
(74) *Attorney, Agent, or Firm* — David B. Kelley; Brooks Kushman P.C.

(57) ABSTRACT

A clutch for a Rear Drive Unit (RDU) selectively couples one of the half-shafts to an intermediate shaft. The clutch is actuated with a ball-ramp mechanism having a plate that rotates in response to rotation of a motor. In order to provide precise control of clutch torque capacity, a high gear reduction is desirable. Gear reduction is provided by a planetary gear set located co-axially with the clutched half-shaft. In addition to providing a relatively high gear ratio, this is more likely to fit into the available space without interfering with other components.

15 Claims, 4 Drawing Sheets

REAR DRIVE UNIT CLUTCH ASSEMBLY

TECHNICAL FIELD

This disclosure relates to the field of vehicle drivelines. More particularly, the disclosure pertains to a rear drive unit utilizing a planetary gear set to engage a ball-ramp clutch.

BACKGROUND

Two vehicle powertrain configurations predominate the modern passenger vehicle market, rear wheel drive (RWD) and front wheel drive (FWD). With additional hardware, both of these configurations can be configured to direct power to all four wheels. Because traction at any particular wheel may be limited at certain times, the ability to direct power to all four vehicle improves mobility. However, the additional hardware introduces additional parasitic losses which increase fuel consumption even in conditions that do not require the additional capability.

In a typical RWD configuration, the engine is oriented longitudinally in the vehicle such that the crankshaft axis is aligned with the direction of vehicle movement. A transmission mounted to the engine drives a rear driveshaft at a speed which may be less than or greater than the speed of the engine crankshaft according to current vehicle requirements. The rear driveshaft is connected to a rear axle that changes the axis of rotation, reduces the rotational speed, and drives left and right rear axles while permitting slight speed differences between the axles as the vehicle turns a corner. A RWD configuration is adapted to also drive the front wheels by adding a transfer case between the transmission and the rear driveshaft. In addition to driving the rear driveshaft, the transfer case drives a front driveshaft that, in turn, drives a front axle. Some transfer cases include a planetary gear set that divides the torque between front and rear driveshafts while allowing slight speed differences. Other transfer cases have an actively controlled torque on demand (TOD) clutch that only drives the front driveshaft in certain conditions, such as when a controller senses loss of traction of the rear wheels.

In a typical FWD configuration, the engine is oriented transversely in the vehicle such that the crankshaft axis is aligned with the axis of wheel rotation. A transmission mounted to the engine drives a front differential at a speed suitable for current vehicle requirements. The front differential is typically integrated into a common housing with the transmission gearbox. The front differential drives left and right front axles while permitting slight speed differences between the axles as the vehicle turns a corner. A FWD configuration is adapted to also drive the rear wheels by adding a power take off unit (PTU) that drives a rear driveshaft at a speed proportional to the speed of the front differential. A rear drive unit (RDU) typically includes a TOD clutch that, when engaged drives a rear differential that, in turn, drives left and right rear axles.

SUMMARY OF THE DISCLOSURE

A clutch includes a first plate, a planetary gearset, and a plurality of rolling elements such as spheres. The first plate is supported to move axially to squeeze a clutch pack. The clutch pack may include a plurality of separator plates splined to a clutch housing and a plurality of friction plates interleaved with the separator plates. The planetary gearset is configured to rotate a second plate in response to rotation of a sun gear. The planetary gearset may also include a carrier fixedly coupled to the second plate and a ring gear fixedly held against rotation. Alternatively, the planetary gearset may be a stepped planet type with a carrier, a first ring gear held against rotation, and a second ring gear fixedly coupled to the second plate. The sun gear is driveably connected to a motor. The motor axis may be parallel or perpendicular to an axis of the gearset. The rolling elements are held between facing surfaces of the first and second plates. The facing surfaces are inclined such that the first and second plates separate axially from one another in response to rotation of the second plate.

An axle assembly includes a differential, a clutch pack, and a ball-ramp mechanism. The differential constrains a differential ring gear to rotate at a speed equal to an average speed of a first half-shaft and an intermediate shaft. The clutch pack selectively couples the intermediate shaft to a second half-shaft in response to axial force on a pressure plate. The axial force is provided by the ball-ramp mechanism in response to rotation of a motor. The ball-ramp mechanism including a planetary gearset having a sun gear supported for rotation about the second half-shaft and driveably connected to the motor, a stationary ring gear, and a carrier. The ball-ramp mechanism also includes first and second plates and a plurality of rolling elements. The first plate moves axially to exert force on the pressure plate. The second plate rotates about the second half-shaft. The plurality of rolling elements are held between facing surfaces of the first and second plates. The facing surfaces are inclined such that the first and second plates separate axially in response to rotation of the second plate. The second plate may be fixedly coupled to the carrier. Alternatively, the second plate may be fixedly coupled to a rotatable ring gear with the sun gear and two rings gears linked by stepped planet gears.

A rear drive unit clutch actuator includes a ball-ramp mechanism and a planetary gearset. The ball-ramp mechanism moves a non-rotatable plate axially in response to rotation of a rotatable plate. The planetary gearset includes a sun gear, first and second ring gears, a carrier, and a set of stepped planet gears. The sun gear is supported for rotation about a half-shaft and is driveably connected to a motor. The first ring gear is fixedly held against rotation. The second ring gear is fixedly coupled to the rotatable plate. The stepped planet gears each have first and second sets of gear teeth. The first pitch diameter of the first set is greater than the pitch diameter of the second set. The first set of gear teeth mesh with the sun gear and the first ring gear. The second set of gear teeth mesh with the second ring gear.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotatable elements are fixedly coupled to one another if they are constrained to rotate at the same speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. In contrast, two rotatable elements are selectively coupled by a shift element when the shift element constrains them to rotate at the same speed about the same axis whenever it is fully engaged and the rotatable elements are free to have distinct speeds in at least some other operating condition. A shift element that holds a rotatable element against rotation by selectively connecting it to the housing is called a brake. A shift element that selectively couples two or more rotatable elements to one another is called a clutch. Two rotatable elements are driveably connected if they are linked by a power flow path such that rotation of one element causes a proportional amount of rotation of the other element.

Figure 1:
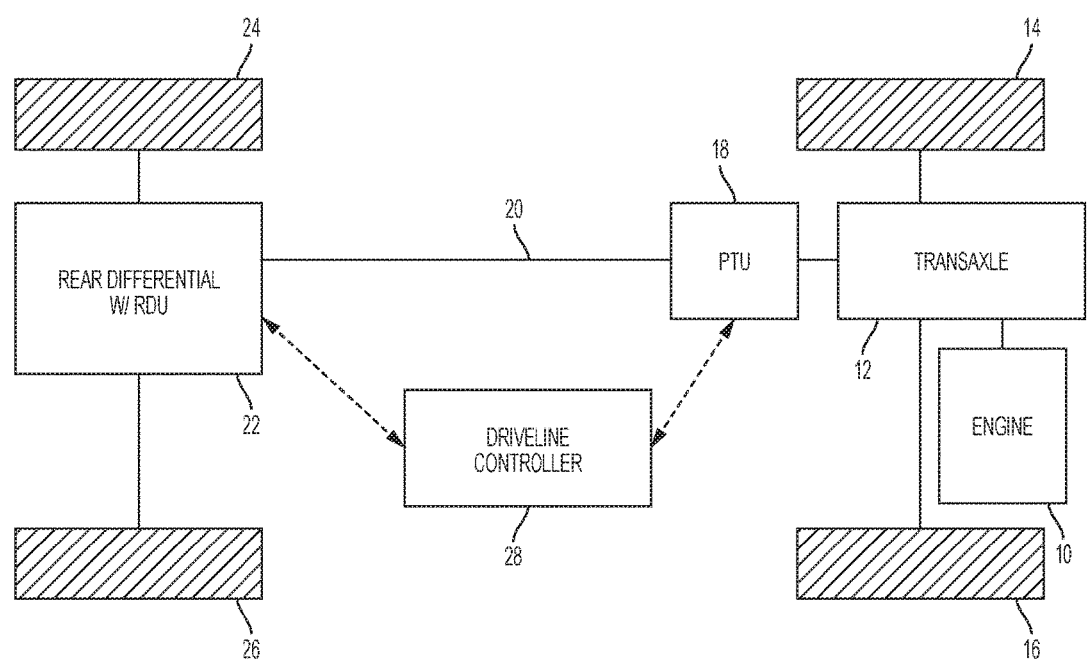
FIG. 1 is a schematic diagram of a vehicle powertrain.

FIG. 1 schematically illustrates an all-wheel drive vehicle powertrain. The heavy lines indicate the flow of mechanical power, whereas the dashed lines indicate the flow of information. An internal combustion engine 10 generates mechanical power by converting stored chemical energy in a fuel source. Transaxle 12 adapts the speed and torque of the mechanical power produced by the engine to suit the current needs of the vehicle. Transaxle 12 includes a multiple-ratio gearbox and also a front differential that provides roughly equal torque to left and right front wheels 14 and 16 while accommodating slight differences in speed such as when the vehicle turns a corner. A Power Take-off Unit (PTU) 18 driveably connects the output of the multiple-ratio gearbox of transaxle 12 to driveshaft 20. The PTU may have a disconnect clutch such that some of the parasitic losses associated with AWD operation are eliminated when AWD is not needed. Rear differential 22 includes an integrated Rear Drive Unit (RDU). When the RDU is engaged, rear differential 22 transmits roughly equal torque to left and right rear wheels 24 and 26 while accommodating slight differences in speed.

Controller 28 adjusts the state of any PTU disconnect clutch and the RDU clutch. Specifically, when the vehicle is in a Front Wheel Drive (FWD) operating mode, controller 28 signals PTU 18 to disconnect driveshaft 20 from transaxle 12 and signals disengagement of the RDU clutch within rear differential 22. By so doing, the driveshaft can remain stationary as the vehicle moves, reducing the parasitic drag associated with driveshaft rotation and improving fuel economy. When the vehicle is in an All Wheel Drive (AWD) operating mode, the controller signals PTU 18 to connect the transaxle to driveshaft 20. Then, controller 28 monitors vehicle traction and signals the RDU clutch to transmit power when it detects a loss of traction at the front wheels. Controller 28 may also signal the RDU clutch to engage in advance of maneuvers that are likely to cause loss of front wheel traction. Controller 28 may be a stand-alone driveline controller or may be integrated into another controller such as a transaxle controller or powertrain controller.

Figure 2:
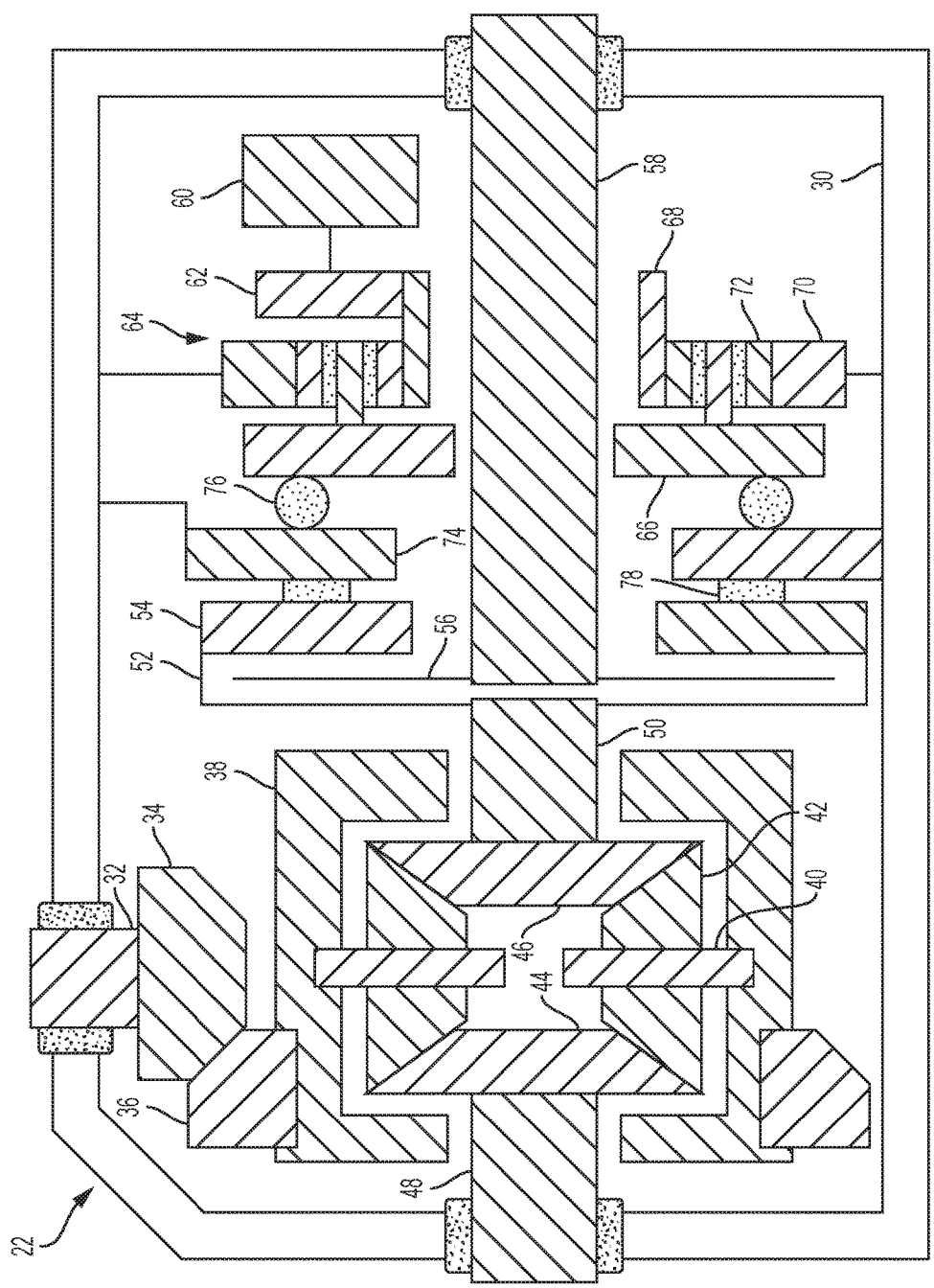
FIG. 2 is a schematic cross section of a rear differential suitable for use in the powertrain of FIG. 1.

FIG. 2 illustrates the structure of rear differential 22. The differential is encased in a housing 30. In vehicles with independent rear suspension, housing 30 is fixed to vehicle structure. In vehicles with a solid rear axle, housing 30 is suspended and moves with the half-shafts. The housing does not rotate in either type of vehicle. Housing 30 is partially filled with fluid that provides lubrication to moving components and convects heat generated by friction to the housing, from which the heat is dissipated.

Power enters the rear differential from driveshaft 20 via stub shaft 32 which is fixed to drive pinion 34. Drive pinion 34 is in continuous meshing contact with ring gear 36. The axes of rotation of pinion 34 and ring gear 36 are offset by approximately 90 degrees. They may also be vertically offset, in which case hypoid gear geometry is common. Ring gear 36 is fixed to differential carrier 38. A number of planet shafts 40 are fixed to an interior of differential carrier 38. A number of beveled planet gears 42 are supported for rotation with respect to each of the planet shafts. Alternatively, the planet gears could be fixed to the planet shafts and the planet shafts could rotate with respect to the carrier. Each of the beveled planet gears 42 mesh with a left side gear 44 and a right side gear 46. The left side gear 44 is fixed to a left half shaft 48 while the right side gear 46 is fixed to an intermediate shaft 50. The beveled differential gearing constrains the differential carrier 38 to rotate at the average speed of left and right side gears 44 and 46. The differential gearing also divides the torque evenly between left and right side gears 44 and 46. In some embodiments, double pinion planetary gearing may replace the bevel gear differential gearing.

Clutch housing 52 is fixed to intermediate shaft 50. Pressure plate 54 is splined to clutch housing 52 such that it rotates with the clutch housing but can move slightly axially. Friction plate 56 is splined to right half shaft 58 and extends between clutch housing 52 and pressure plate 54. Some embodiments may have multiple friction plates separated from one another by separator plates that are splined to clutch housing 52. The pressure plate, friction plates, and separator plates are collectively called a clutch pack.

To engage the RDU clutch, controller 28 commands motor 60 to rotate. Gear 62 is fixedly coupled to the rotor shaft of motor 60. Planetary gear set 64 includes carrier 66, sun gear 68, ring gear 70. and planet gears 72. Planet gears 72 are supported for rotation with respect to carrier 66. Each planet gear 72 meshes with both sun gear 68 and ring gear 70. Sun gear 68 meshes with gear 62 such that it rotates in response to rotation of motor 60. Ring gear 70 is fixed to differential housing 30. The rotational displacement of carrier 66 is a fraction of the rotation displacement of motor 60. Some gear reduction may be accomplished by making gear 62 smaller than gear 68. Additional gear reduction is accomplished by planetary gear set 64.

Figure 3:
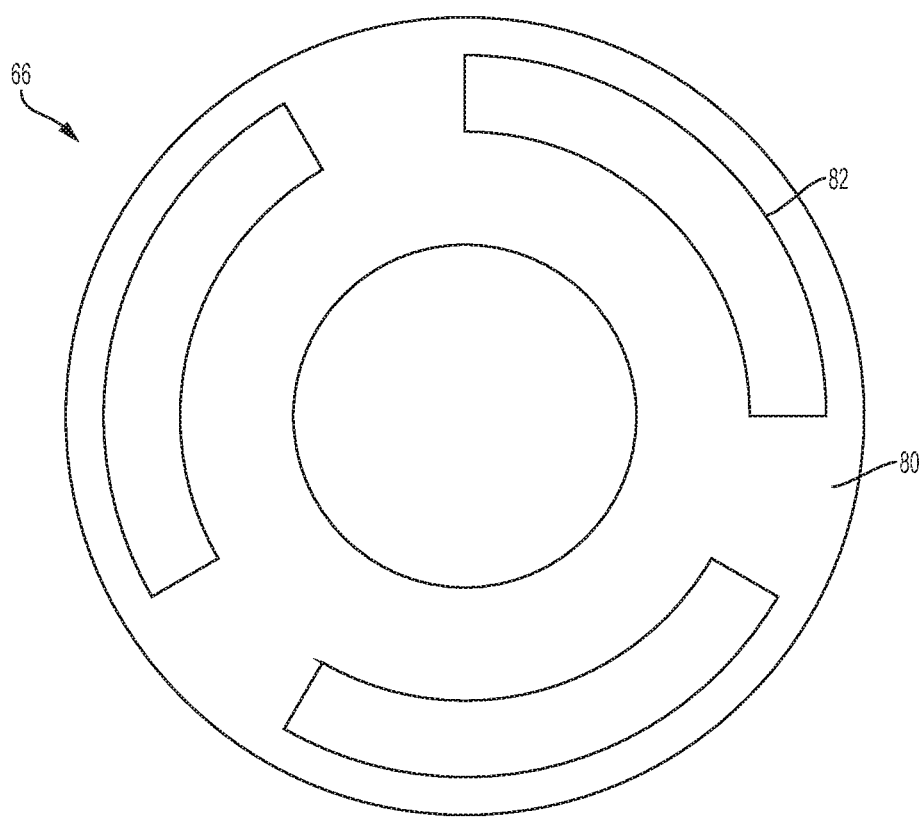
FIG. 3 is an end view of the planetary gear set carrier of the rear differential of FIG. 2.

Stationary ball-ramp plate 74 is splined to housing 30 such that it does not rotate but can move axially. As shown in FIG. 3, carrier 66 has a surface 80 facing the stationary ball-ramp plate 74. Similarly, stationary ball-ramp plate 74 has a surface facing the carrier. The carrier and the stationary ball-ramp plate have a number of grooves 82 in the surfaces that face the other part. A number of balls 76 are held between carrier 66 and plate 74 in these grooves. The balls may be retained by a ball carrier (not shown) that maintains a constant angular separation between adjacent balls. The grooves in at least one of carrier 66 and plate 74 have a ramp such that relative rotation between carrier 66 and plate 74 in one direction forces plate 74 to move axially away from carrier 66. A thrust bearing 78 separates plate 74 and pressure plate 54. As plate 74 moves to the left, it forces pressure plate 54 to also move to the left via thrust bearing 78. This squeezes friction plate 56 between pressure plate 54 and clutch housing 52. The torque capacity of the RDU clutch is proportional to the force squeezing the friction plate. To release the clutch, motor 60 is commanded to rotate in the opposite direction, relieving the force.

When the RDU clutch is disengaged, intermediate shaft 50 is free to rotate at a different speed than right half shaft 58. The speed of intermediate shaft 50 is determined by the speeds of driveshaft 20 and left rear wheel 24. The right half shaft 58 is determined by the speed of right rear wheel 26. No torque is transferred to right half shaft 58 by the clutch. Since the torque on the two half shafts are equal to one another, no torque is transferred to left half shaft 48.

When the front wheels lose traction, the front wheels will begin to rotate faster than the rear wheels. If the PTU disconnect is engaged, differential carrier 38 will rotate at the same speed as the carrier of the front differential which is equal to the average speed of the front wheels. Since carrier 38 is rotating faster than left rear wheel 24, intermediate shaft 50 will rotate even faster than carrier 38. In this speed condition, the RDU clutch will transmit torque to the right wheel equal to the torque capacity of the clutch. (When the clutch is disengaged, the torque capacity is zero). That provides a reaction torque such that an equal torque is also transmitted to the left rear wheel.

The arrangement of FIG. 2 provides advantages relative to other types of clutch actuation. Space in the vehicle near the rear differential is often at a premium, especially space radially away from the axle axis. In vehicles with torque vectoring, the components that implement the torque vectoring must be packaged within this space. Planetary gear set 62 is located on the rear axle axis, taking up considerably less radial space off the axis than layshaft gearing would. A high degree of torque multiplication between motor 60 and carrier 66 permits a smaller motor and more precise control of torque capacity.

Figure 4:
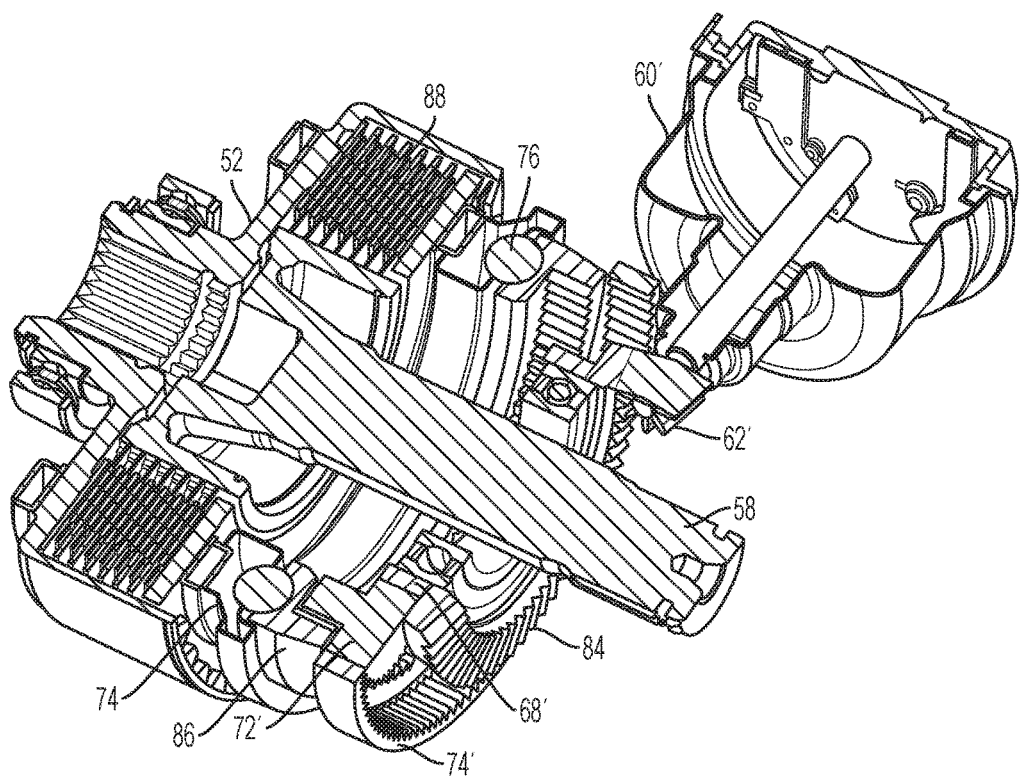
FIG. 4 is a pictorial cut-away view of an RDU clutch and actuation mechanism.

FIG. 4 illustrates another embodiment of a RDU clutch and associated actuation mechanism. In this embodiment, the shaft of motor 60' is oriented perpendicular to half-shafts. Motor 60' drives bevel gear 62' which meshes with bevel gear 84. Bevel gear 84 is fixed to sun gear 68'. Planet gear 72' is a stepped planet gear which rotates with respect to a planet carrier (not shown in FIG. 4). The larger diameter set of gear teeth of stepped planet gear 72' mesh with sun gear 68' and first ring gear 74'. First ring gear 74' is held against rotation by a connection to the differential housing (not shown). The smaller diameter set of gear teeth of stepped planet gear 72' mesh with second ring gear 86.

Via this mechanism, rotation of motor 60' results in a proportional rotation of second ring gear 86. Two levels of gear reduction provide a large ratio of motor speed to second ring gear speed. The first level of gear reduction is provided by beveled gears 62' and 84. The second level of gear reduction is provided by the planetary gear set. The stepped planet gear set of FIG. 4 is capable of significantly higher gear reduction than the simple planetary gear set of FIG. 2. This high degree of gear reduction enables precise control of the rotational position of second ring gear 86 via motor 60'.

Ring gear 86 has grooves similar to those shown in FIG. 3. A set of balls 76 is supported between second ring gear 86 and non-rotating plate 74 within these grooves. The grooves are sloped such that rotation of second ring gear 86 results in axially movement of non-rotating plate 74. Axial movement of non-rotating plate 74 toward the left in FIG. 4 squeezes clutch pack 88, resulting in torque transmission between housing 52 and half-shaft 58.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A clutch comprising:
 a first plate supported to move axially to squeeze a clutch pack, wherein the clutch pack includes a plurality of separator plates splined to a clutch housing and a plurality of friction plates interleaved with the separator plates;
 a planetary gearset configured to rotate a second plate in response to rotation of a sun gear driveably connected to a motor, wherein the planetary gearset includes a carrier fixedly coupled to the second plate, a ring gear fixedly held against rotation, the sun gear, and a plurality of planet gears supported for rotation relative to the carrier and meshing with the ring gear and the sun gear; and
 a plurality of rolling elements held between facing surfaces of the first and second plates, the facing surfaces being inclined such that the first and second plates separate axially in response to rotation of the second plate.

2. The clutch of claim 1 wherein the motor has a motor axis oriented parallel to an axis of the planetary gearset.

3. The clutch of claim 1 wherein the motor has a motor axis oriented perpendicular to an axis of the planetary gearset.

4. The clutch of claim 1 wherein the rolling elements are spheres.

5. An axle assembly comprising:
 a differential configured to constrain a differential ring gear to rotate at a speed equal to an average of a speed of a first half-shaft and a speed of an intermediate shaft;
 a clutch pack configured to selectively couple the intermediate shaft to a second half-shaft in response to axial force on a pressure plate; and
 a ball-ramp mechanism configured to exert axial force on the pressure plate in response to rotation of a motor, the ball-ramp mechanism including a planetary gearset having a sun gear supported for rotation about the second half-shaft and driveably connected to the motor, a stationary ring gear, and a carrier.

6. The axle assembly of claim 5 wherein the ball-ramp mechanism comprises:
  a first plate supported to move axially to exert force on the pressure plate;
  a second plate supported for rotation about the second half-shaft; and
  a plurality of rolling elements held between facing surfaces of the first and second plates, the facing surfaces being inclined such that the first and second plates separate axially in response to rotation of the second plate.

7. The axle assembly of claim 6 wherein the second plate is fixedly coupled to the carrier.

8. The axle assembly of claim 6 further comprising:
  a rotatable ring gear fixedly coupled to the second plate; and
  a plurality of stepped planet gears supported for rotation with respect to the carrier, wherein each of the stepped planet gears have a first set of gear teeth meshing with the sun gear and the stationary ring gear and a second set of gear teeth meshing with the rotatable ring gear.

9. The axle assembly of claim 8 wherein the first set of gear teeth has a pitch diameter greater than a pitch diameter of the second set of gear teeth.

10. The axle assembly of claim 5 wherein the motor has a motor axis oriented parallel to an axis of the second half-shaft.

11. The axle assembly of claim 5 wherein the motor has a motor axis oriented perpendicular to an axis of the second half-shaft.

12. A rear drive unit clutch actuator comprising:
  a ball-ramp mechanism configured to move a non-rotatable plate axially in response to rotation of a rotatable plate; and
  a planetary gearset having a sun gear supported for rotation about a half-shaft and driveably connected to a motor, a first ring gear fixedly held against rotation, a carrier, a second ring gear fixedly coupled to the rotatable plate, and a plurality of stepped planet gears.

13. The clutch actuator of claim 12 wherein the stepped planet gears each have a first set of gear teeth with a first pitch diameter and a second set of gear teeth with a second pitch diameter less that the first pitch diameter, the first set of gear teeth meshing with the sun gear and the first ring gear, the second set of gear teeth meshing with the second ring gear.

14. The clutch actuator of claim 13 wherein the motor has a motor axis oriented parallel to an axis of the half-shaft.

15. The clutch actuator of claim 13 wherein the motor has a motor axis oriented perpendicular to an axis of the half-shaft.

* * * * *